United States Patent [19]

Katsuki

[11] Patent Number: 5,244,627

[45] Date of Patent: Sep. 14, 1993

[54] FERROMAGNETIC THIN FILM AND METHOD FOR ITS MANUFACTURE

[75] Inventor: Toshiyuki Katsuki, Kumamoto, Japan

[73] Assignee: Matsushita Electric Industrial Co., Ltd., Osaka, Japan

[21] Appl. No.: 805,141

[22] Filed: Dec. 11, 1991

[30] Foreign Application Priority Data

Dec. 13, 1990 [JP] Japan .................. 2-401897

[51] Int. Cl.$^5$ .............................................. C22C 38/12
[52] U.S. Cl. ................................ 420/127; 420/128; 420/125; 148/306
[58] Field of Search ............... 148/306, 307; 420/125, 420/127, 128

[56]  References Cited

U.S. PATENT DOCUMENTS

| | | | |
|---|---|---|---|
| 4,082,579 | 4/1978 | Masumoto et al. | 148/306 |
| 5,084,795 | 1/1992 | Sakakima et al. | 360/120 |
| 5,091,024 | 2/1992 | DeBold et al. | 148/306 |
| 5,104,464 | 4/1992 | Hasegawa | 148/300 |

FOREIGN PATENT DOCUMENTS

| | | | |
|---|---|---|---|
| 0286124 | 10/1988 | European Pat. Off. | |
| 0288316 | 10/1988 | European Pat. Off. | 148/306 |
| 47-38284 | 9/1972 | Japan | 148/306 |
| 50-7535 | 3/1975 | Japan | 148/306 |
| 55-113304 | 9/1980 | Japan | 148/306 |
| 59-78503 | 5/1984 | Japan | |
| 60-128235 | 7/1985 | Japan | |
| 18604 | 1/1989 | Japan | |
| 1-144603 | 6/1989 | Japan | |

*Primary Examiner*—John P. Sheehan
*Attorney, Agent, or Firm*—Lowe, Price, LeBlanc & Becker

[57]  ABSTRACT

A ferromagnetic thin film comprising Fe as a main component, at least one element of B, C, Al and Si and at least one transition metal element except noble metals Au, Ag, Ru, Pd, Os, Ir and Pt. This can accomplish a ferromagnetic thin film having a high saturation flux density, a high initial permeability and a low coercive force, and also having an excellent corrosion resistance and thermal resistance. The ferromagnetic thin film having the above high performances can be manufactured in a high yield by forming the above materials into a film in an atmosphere of a mixed gas of Ar and $N_2$, and thereafter heating the film at a given temperature. It is possible to give a magnetic head suitable for high-density recording, that enables good recording and reproducing on and from a magnetic recording medium having a high coercive force.

4 Claims, 3 Drawing Sheets

FERROMAGNETIC THIN FILM AND METHOD FOR ITS MANUFACTURE

BACKGROUND OF THE INVENTION

1. Field of the Invention

This invention relates to a ferromagnetic thin film suitable for magnetic heads used in high-density recording on magnetic tapes, magnetic disks or the like, and a method of manufacturing the same.

2. Description of the Prior Art

In recent years, with an improvement in high-density recording on magnetic tapes, magnetic disks or the like, coercive force (Hc) of recording mediums has been more and more increasing. In metal thin-film mediums, those having a coercive force (Hc) of 1,000 Oe or more have been put into practical use. Meanwhile, in order to achieve good recording performances well making the most of the characteristics of magnetic recording mediums having such a coercive force, it is required for magnetic heads to have a high saturation flux density and also to have both a high permeability and a low coercive force also when reproduction is carried out using the same magnetic head. In addition, corrosion resistance, thermal resistance, etc. also must be taken into account as important factors. Vertical magnetic recording systems in which recording is performed by magnetizing a magnetic recording medium not in its longitudinal direction but in its thickness direction have also being put into practical use. In this instance, the end portion of main magnetic pole of a magnetic head must be not larger than 0.5 μm in thickness and hence a magnetic head having a high saturation flux density is required in order to also perform recording in a magnetic recording medium having a relatively high coercive force. To meet such demand, permalloy (an Ni-Fe alloy), sendust (an FeAlSi alloy), an amorphous alloy, an FeRuGaSi alloy, etc. are recently proposed (Japanese Laid-open Patent Application No. 64-8604. An Fe-Si alloy (Japanese Laid-open Patent Application No. 59-78503, an Fe-C alloy, an Fe-Pt-C alloy (Japanese Laid-open Patent Application No. 1-144603) are also disclosed as materials having a high saturation flux density.

However, various studies made on such conventional alloys have revealed that the permalloy, sendust, amorphous alloy and FeRuGaSi alloy have the problem that they have a low saturation flux density Ms, the Fe-Si alloy and Fe-C alloy have a difficulty in corrosion resistance, and the Fe-Pt-C alloy has the problem that it has a low thermal resistance.

SUMMARY OF THE INVENTION

The present invention solves the above problems involved in the prior art. An object of the present invention is to provide a ferromagnetic thin film having a high saturation flux density, initial flux density, etc. and having a superior corrosion resistance and thermal resistance, and to provide a method of manufacturing such a thin film.

The above object of the present invention can be achieved by a ferromagnetic thin film comprising Fe as a main component, at least one element of B, C, Al and Si and at least one transition metal element except noble metals Au, Ag, Ru, Pd, Os, Ir and Pt, and also by a method of manufacturing such a ferromagnetic thin film, comprising the steps of forming a film in an atmosphere of a mixed gas of Ar and $N_2$, and thereafter heating the film at a temperature ranging from 200° C. to 800° C.

DESCRIPTION OF THE PREFERRED EMBODIMENTS

A preferred embodiment of the present invention will be described below with reference to the accompanying drawings.

EXAMPLE 1

Figure 1:
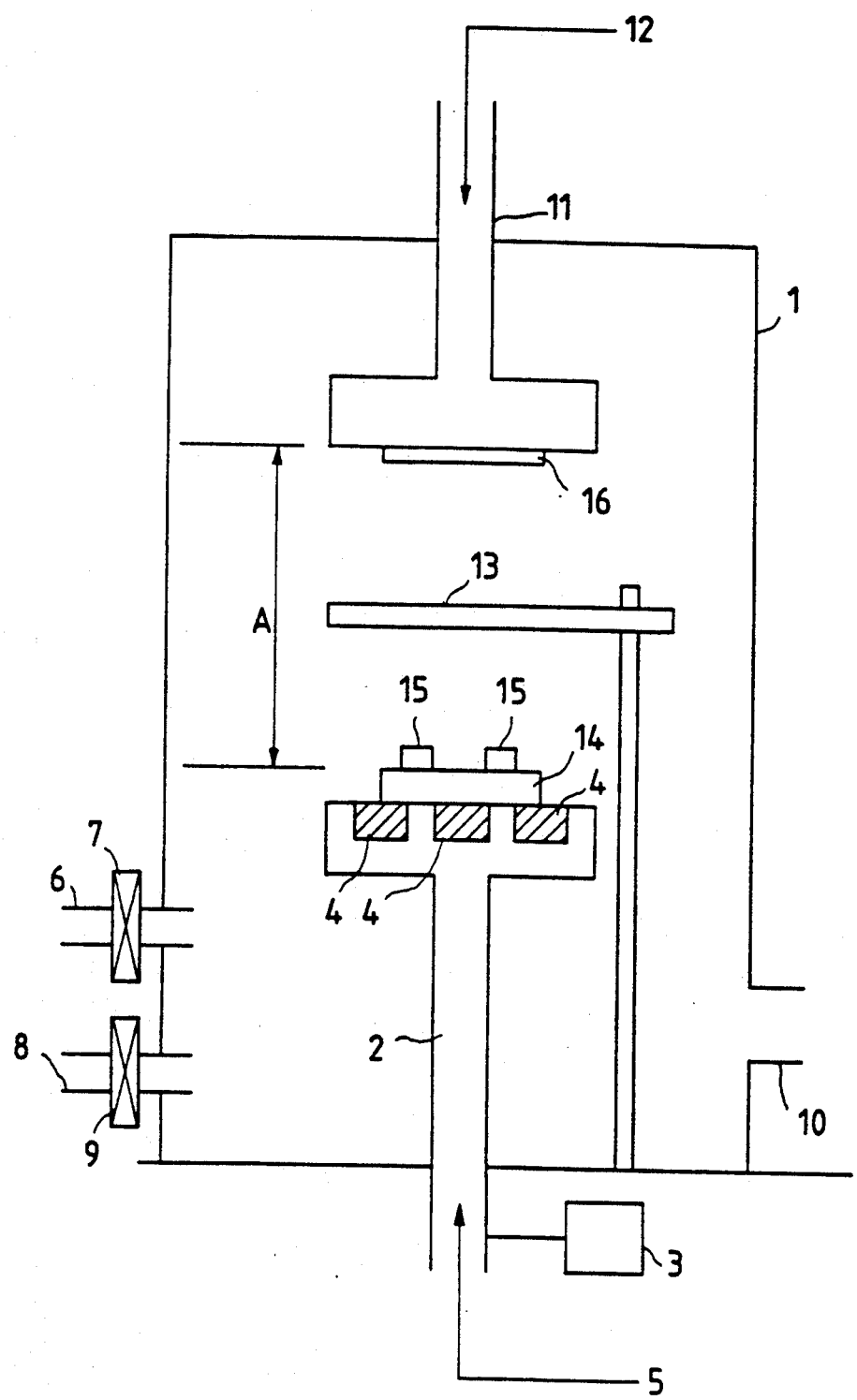
FIG. 1 is a schematic illustration of the constitution of a high-frequency sputtering apparatus suited for the manufacturing method in an embodiment of the present invention.

FIG. 1 schematically illustrates the constitution of a high-frequency sputtering apparatus suited for the manufacturing method in an embodiment of the present invention.

In FIG. 1, reference numeral 1 denotes a chamber and 2 denotes a target electrode portion. A high-frequency power source 3 is connected to the target electrode portion 2. A plurality of magnets 4 are also provided in the target electrode portion 2. The target electrode portion 2 is so designed that cooling water is circulated therethrough, and hence can be cooled in the course of sputtering. Reference numeral 6 denotes an Ar gas feed pipe connected to the chamber 1, and the Ar gas feed pipe 6 is provided with a flowmeter 7. Reference numeral 8 denotes an $N_2$ gas feed pipe, and the $N_2$ gas feed pipe 8 is provided with a flowmeter 9. Reference numeral 10 denotes an exhaust vent through which the inside of the chamber is exhausted, and 11 denotes an opposing electrode portion disposed opposingly to the target electrode portion 2. The opposing electrode portion 11 also is so designed that cooling water is circulated therethrough, like the target electrode portion 2, and hence can be cooled in the course of sputtering. Reference numeral 13 denotes a shutter disposed between the target electrode portion 2 and the opposing electrode portion 11, and 14 denotes an Fe substrate provided on the target electrode portion 2. The Fe substrate 14 may preferably have a purity of not less than 99.999%. Reference numeral 15 denotes a plurality of pellets provided on the Fe substrate 14. The pellets 15 are made of additive elements used for making up a given alloy composition, and may preferably have a purity of not less than 99.999%. Reference numeral 16 denotes a substrate provided on the opposing electrode portion 11, and the substrate 16 is constituted of a ceramic material.

A film was formed by sputtering under the following conditions: High-frequency power density: 0.36 $W/cm^2$; Ar flow rate: 1.5 SCCM; $N_2$ flow rate: 0.08 SCCM; temperature of the substrate 16: 20° C. or below; and distance A between electrodes: 86 mm. An FC 105 substrate (glass ceramic) available from Corning Inc. was used as the substrate 16. The alloy composition can be varied by changing the proportion of the number of the pellets 15 made of the same element, or changing the size of the pellets. Ferromagnetic thin films were formed under such conditions, which were made to have a constant layer thickness of 2.0 μm.

After the film formation, annealing was carried out at a temperature condition of from 200° C. to 800° C. Initial permeability was determined as a value at 1 MHz. Coercive force was measured using a B-H loop tracer. Rate of corrosion was calculated according to the expression: $(Ms-Ml) \times 100/Ms$, wherein Ms represents a saturation flux density before a corrosion test and Ml represents a saturation flux density after the corrosion test. The corrosion test was carried out by leaving samples to stand for 240 hours in an environment of a temperature of 65° C. and a relative humidity of 95%.

Under the above manufacture conditions, pellets 15 respectively made of Hf, Ta and C were disposed on the substrate 14. An Ar-$N_2$ mixed gas was fed into the chamber 1. In this way, ferromagnetic thin films with varied composition were formed. Then the saturation flux density (Ms), coercive force (Hc) and rate of corrosion $(Ms-Ml) \times 100/Ms$ of the ferromagnetic thin films thus obtained were measured. Results obtained are shown in Table 1.

TABLE 1

| Alloy composition of (FeHfTaC)N film (at. %) | Saturation flux density Ms(T) | Coercive force Hc(Oe) | Rate of corrosion $(Ms - Ml) \times 100/MS$ |
|---|---|---|---|
| $(Fe_{98.3}Hf_{0.2}Ta_{0.5}C_{1.0})N$ | 2.0 | 12.0 | 12.5 |
| $(Fe_{98.0}Hf_{0.5}Ta_{0.5}C_{1.0})N$ | 1.9 | 1.0 | 0.625 |
| $(Fe_{90.0}Hf_{2.0}Ta_{3.0}C_{5.0})N$ | 1.8 | 1.0 | 0 |
| $(Fe_{95.0}Hf_{1.5}Ta_{3.5}C_{10.0})N$ | 1.7 | 0.5 | 0 |
| $(Fe_{80.2}Hf_{2.1}Ta_{9.2}C_{8.5})N$ | 1.6 | 0.1 | 0 |
| $(Fe_{75.0}Hf_{6.0}Ta_{7.0}C_{12.0})N$ | 1.4 | 0.4 | 0 |
| $(Fe_{70.0}Hf_{7.0}Ta_{8.0}C_{15.0})N$ | 1.2 | 0.3 | 0 |
| $(Fe_{64.8}Hf_{9.2}Ta_{11.0}C_{15.0})N$ | 0.9 | 0.8 | 0 |
| $(Fe_{62.5}Hf_{9.5}Ta_{10.0}C_{18.0})N$ | 0.8 | 1.0 | 0 |
| $(Fe_{61.0}Hf_{9.0}Ta_{11.0}C_{20.0})N$ | 0.6 | 3.8 | 0 |

As is clear from Table 1, the saturation flux density (Ms) dropped to 0.6 T when the additive elements were in an amount of 38 at. % or more. Since a permalloy (Ni-19 wt. % Fe alloy) film, which is a material conventionally put into practical use, has a saturation flux density of 0.8 or less, it was found that the additive elements must be added in an amount of 39 at. % or less.

Then, studies were made on the rate of corrosion. The permalloy (Ni-19 wt. % Fe alloy) has the properties as shown in Table 2.

TABLE 2

| Alloy composition (at. %) | Saturation flux density Ms(T) | Coercive force Hc(Oe) | Initial permeability μ(1 MHz) | Corrosion resistance (%) $(Ms - Ml) \times 100/Ms$ | Thermal resistance (°C.) |
|---|---|---|---|---|---|
| $Ni_{81}Fe_{19}$ (wt. %) | 0.8 | 0.20 | 3,000 | 0 | 400 |
| $Fe_{73.2}Al_{10.8}Si_{16}$ | 1.0 | 0.30 | 2,000 | 10 | 600 |
| $Co_{80}Zr_{20}$ | 1.0 | 0.10 | 3,000 | 0 | 550 |
| $Fe_{71.4}Ru_{4.0}Ga_{5.7}Si_{17.4}O_{1.5}$ | 1.2 | 0.09 | 2,000 | 8.33 | 550 |
| $Fe_{94.5}Si_{5.5}$ | 1.8 | 1.40 | 800 | 50 | 350 |
| $Fe_{99}C_1$ | 2.1 | 40 | 800 | 68.75 | 100 |
| $Fe_{80}Pt_{10}C_{10}$ | 1.5 | 0.80 | 1,000 | 0 | 300 |
| $Co_{90}Zr_{10}$ | 1.5 | 0.10 | 3,000 | 0 | 300 |

Figure 2:
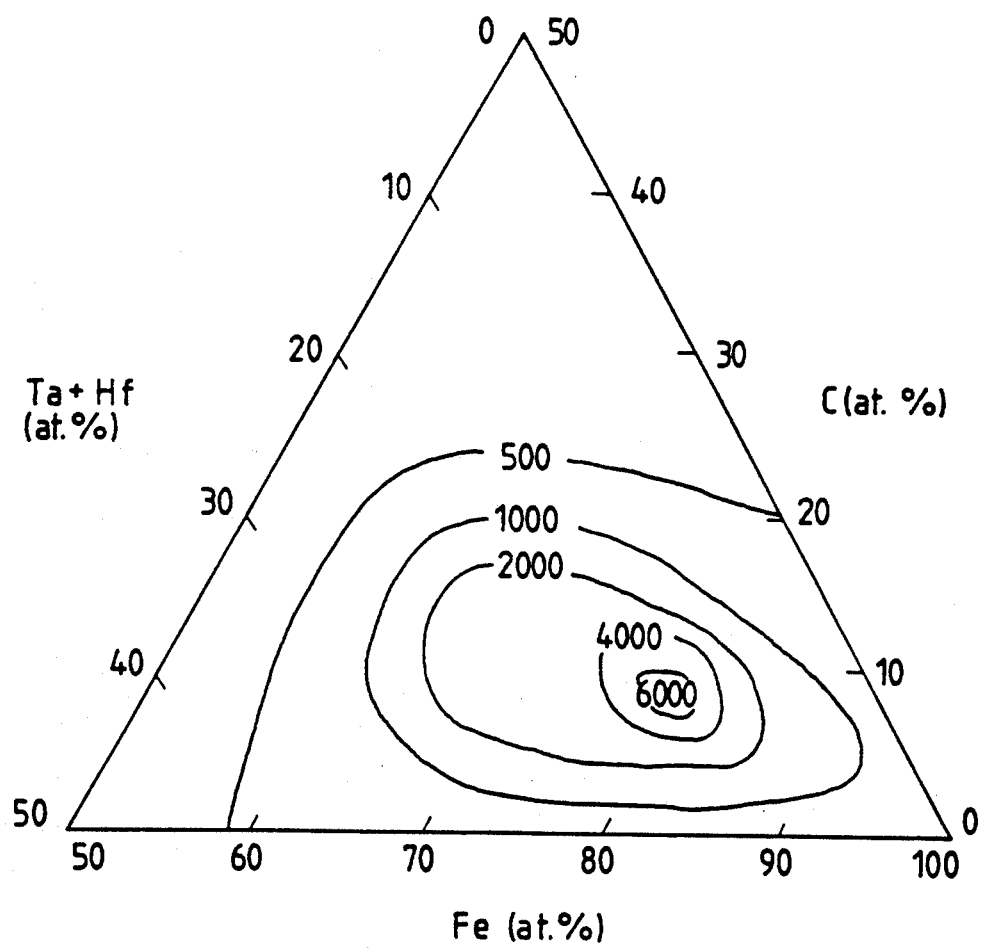
FIG. 2 is a view to illustrate the state of initial permeability of an (FeTaHfC)N film which is a ferromagnetic thin film of the present invention.

Limits to the rate of corrosion were studied on the basis of a sendust ($Fe_{73.2}Al_{10.8}Si_{16}$ at. % alloy), which is a material having been put into practical use. As shown in Table 2, the rate of corrosion of the sendust alloy is 10%. Namely, as is also seen from Table 1, the rate of corrosion of the samples according to the present invention is 0.625% when the additive elements are added in an amount of 2 at. %. Thus the additive elements in the ferromagnetic thin film mainly composed of Fe should be controlled to range from 2 to 38 at. %, whereby it is possible to attain a corrosion resistance superior to that of conventional magnetic materials. Studies were further made on the initial permeability μi. As shown in Table 2, conventional materials an $Fe_{94.5}Si_{5.5}$ at. % alloy and an $Fe_{99}C_1$ at. % alloy each have an initial permeability of 800. Taking this into account, it is seen that materials can be used as ferromagnetic thin films for magnetic heads without any problem when they have an initial permeability of 1,000 or more. Hence, as is clear from FIG. 2, a sufficiently high initial permeability can be attained when C is controlled in an amount ranging from 2 to 20 at. %.

EXAMPLE 2

Ferromagnetic thin films with varied composition were prepared in instances in which Ar gas only was used as the sputtering gas (film-forming gas) or in instances in which a mixed gas of Ar and $N_2$ was used. First, pellets 15 respectively made of Hf, Ta, Rh and C were disposed on the substrate 14, and films were formed under the same conditions as previously described. After the films were formed, annealing was carried out at varied temperatures. Results obtained are shown in Table 3.

TABLE 3

| Alloy composition (at. %) | Saturation flux density Ms(T) | Coercive force Hc(Oe) | Initial permeability μ(1 MHz) | Corrosion resistance (%) $(Ms - Ml) \times 100/Ms$ | Annealing temperature (°C.) |
|---|---|---|---|---|---|
| $Fe_{80.2}Ta_{12.0}C_{78}$ | 1.61 | 0.25 | 4,500 | 12.50 | 500 |
| $Fe_{80.2}Ta_{12.0}C_{78}$ | 1.61 | 0.30 | 3,000 | 37.50 | 600 |
| $Fe_{80.2}Ta_{12.0}C_{78}$ | 1.61 | 0.60 | 2,000 | 67.50 | 700 |
| $(Fe_{80.16}Ta_{11.24}C_{8.6})N$ | 1.62 | 0.20 | 4,800 | 0.63 | 500 |
| $(Fe_{80.16}Ta_{11.24}C_{8.6})N$ | 1.62 | 0.22 | 4,700 | 1.25 | 600 |
| $(Fe_{80.16}Ta_{11.24}C_{8.6})N$ | 1.62 | 0.40 | 4,400 | 11.25 | 700 |
| $Fe_{80.18}Hf_{3.0}Ta_{8.5}C_{8.32}$ | 1.60 | 0.20 | 5,000 | 12.50 | 500 |
| $Fe_{80.18}Hf_{3.0}Ta_{8.5}C_{8.32}$ | 1.60 | 0.22 | 4,800 | 25.00 | 600 |
| $Fe_{80.18}Hf_{3.0}Ta_{8.5}C_{8.32}$ | 1.60 | 0.50 | 3,500 | 50.00 | 700 |
| $(Fe_{80.22}Hf_{2.1}Ta_{9.24}C_{8.44})N$ | 1.63 | 0.10 | 6,500 | 0 | 500 |

TABLE 3-continued

| Alloy composition (at. %) | Saturation flux density Ms(T) | Coercive force Hc(Oe) | Initial permeability μ(1 MHz) | Corrosion resistance (%) (Ms − Ml) × 100/Ms | Annealing temperature (°C.) |
|---|---|---|---|---|---|
| (Fe$_{80.22}$Hf$_{2.1}$Ta$_{9.24}$C$_{8.44}$)N | 1.63 | 0.15 | 6,000 | 0 | 600 |
| (Fe$_{80.22}$Hf$_{2.1}$Ta$_{9.24}$C$_{8.44}$)N | 1.63 | 0.30 | 4,800 | 0.63 | 700 |
| Fe$_{80.15}$Hf$_{1.8}$Ta$_{7.85}$Rh$_{1.2}$C$_{9.0}$ | 1.59 | 0.25 | 4,600 | 12.50 | 500 |
| Fe$_{80.15}$Hf$_{1.8}$Ta$_{7.85}$Rh$_{1.2}$C$_{9.0}$ | 1.59 | 0.30 | 3,900 | 12.50 | 600 |
| Fe$_{80.15}$Hf$_{1.8}$Ta$_{7.85}$Rh$_{1.2}$C$_{9.0}$ | 1.59 | 0.65 | 1,800 | 43.75 | 700 |
| (Fe$_{80.18}$Hf$_{1.6}$Ta$_{7.52}$Rh$_{1.5}$C$_{9.2}$)N | 1.62 | 0.15 | 5,800 | 0 | 500 |
| (Fe$_{80.18}$Hf$_{1.6}$Ta$_{7.52}$Rh$_{1.5}$C$_{9.2}$)N | 1.62 | 0.20 | 5,000 | 0 | 600 |
| (Fe$_{80.18}$Hf$_{1.6}$Ta$_{7.52}$Rh$_{1.5}$C$_{9.2}$)N | 1.62 | 0.35 | 4,500 | 0.63 | 700 |

As is clear from Table 3, the corrosion resistance is greatly improved when the Ar-N$_2$ mixed gas is used as the film-forming gas. In addition, the types of additive elements are concerned with the rank of corrosion resistance. The HfTaRhC-N films show the best corrosion resistance, and the HfTaC-N films the show secondly good corrosion resistance. None of TaC-N films show 0% corrosion resistance rate even with use of the Ar-N$_2$ mixed gas. All of those formed in the Ar-N$_2$ mixed gas, however, can be said to be in the range of no practical problem when viewed on the basis of the sendust alloy, shown in Table 2, having been put into practical use.

EXAMPLE 3

Various kinds of ferromagnetic thin films were formed and then their thermal resistance was compared.

Figure 3:
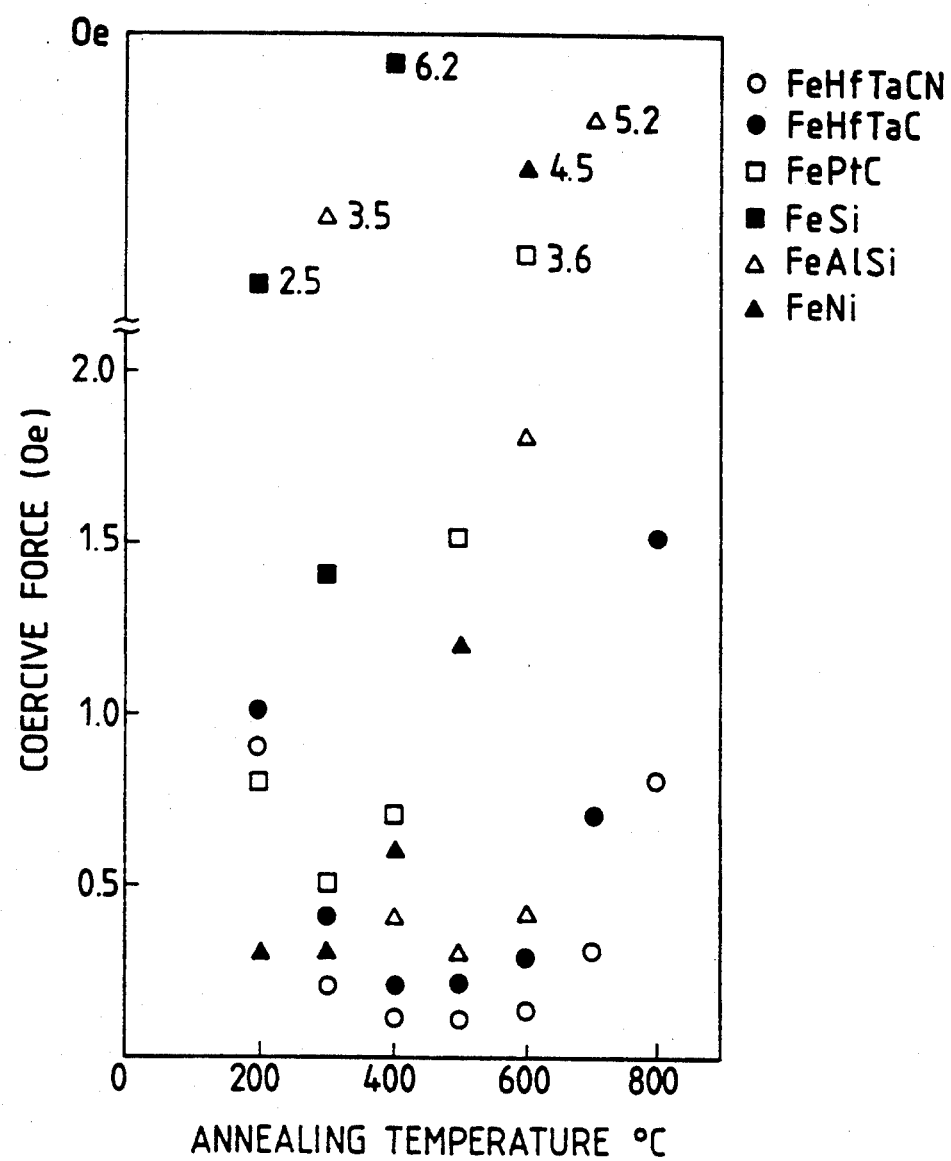
FIG. 3 is a graph to show annealing temperature dependence of coercive force of the ferromagnetic thin film.

FIG. 3 shows annealing temperature dependence of the coercive force of each ferromagnetic thin film. The above Table 3 also contains similar data.

As is clear from FIG. 3, the FeHfTaC-N ferromagnetic thin film according to the present invention shows a low coercive force at temperatures of from 200° to 800° C. The FeHfTaC film, however, shows a coercive force of as high as 1.5 Oe, and is problematic. The conventional FePtC, FeAlSi and FeNi films each show a low coercive force at 400° C., but show a high coercive force at temperatures higher than 600° C., and the FeSi film shows a value of 1.4 Oe at minimum, all of which are also problematic. Hence, the FeHfTaC-N film with a resistance to high temperatures can be said to be preferable as the ferromagnetic thin film for magnetic heads.

As described above, in the present invention the ferromagnetic thin film comprises Fe as a main component, at least one element of B, C, Al and Si and at least one transition metal element except noble metals Au, Ag, Ru, Pd, Os, Ir and Pt. The method of manufacturing the ferromagnetic thin film comprising Fe as a main component, at least one element of B, C, Al and Si and at least one of transition metal elements except noble metals Au, Ag, Ru, Pd, Os, Ir and Pt, comprises the steps of forming a film in an atmosphere of a mixed gas of Ar and N$_2$, and thereafter heating the film at a temperature ranging from 200° C. to 800° C. for its annealing. Such embodiments of the present invention can achieve a saturation flux density Ms of 1.5 T (tesla) or more, an initial permeability of 1,000 or more and a coercive force of 1.0 Oe or less, and also make it possible to manufacture a ferromagnetic thin film with a good corrosion resistance and thermal resistance even when manufactured under conditions involving various heat treatments.

In the present invention, the ferromagnetic thin film should preferably be so composed that at least one element of B, C, Al and Si is contained in an amount of from 1 to 20 at. %, and at least one element of B, C, Al and Si and at least one transition metal elements except noble metals Au, Ag, Ru, Pd, Os, Ir and Pt, are contained in an amount of from 2 to 38 at. %. As manufacturing method other than the method described above, it is also possible to use a method in which materials comprising a suitable combination of Fe, at least one of B, C, Al and Si and a transition metal except noble metals are formed into a film by vacuum deposition, magnetron sputtering, ion-beam sputtering or the electron cyclotron resonance process.

What is claimed is:

1. A ferromagnetic thin film comprising Fe in an amount of from 62.5 to 98.0 at. %, Ta in an amount of from 0.5 to 11.0 at. %, at least one of Hf, Zr and Rh in an amount of from 0.5 to 9.5 at. %, at least one of C, B and Al in an amount of from 1 to 18 at. %, and an amount of N.

2. The ferromagnetic thin film of claim 1 wherein Fe is an amount of from 80.18 to 88.18 at. %; Ta, from 7.52 to 9.24 at. %; C, from 1.2 to 9.20 at. % and at least one of Hf or Rh are selected in an amount of from 1.6 to 3.1 at. %.

3. The ferromagnetic thin film of claim 1 wherein Fe is in an amount of from 80.18 to 88.18 at. %; Ta, 7.52 at. %; C, from 1.2 to 9.20 at. %; and Hf is selected in an amount of 1.6 at. % and Rh is selected in an amount of 1.5 at. %.

4. The ferromagnetic thin film comprising Fe in an amount of 80.22 at. %; Ta, 9.24 at. %; Hf, 2.1 at. %; C, 8.44 at. %; and an amount of N.

* * * * *